United States Patent [19]

Claxton

[11] 4,247,126
[45] Jan. 27, 1981

[54] HYDRAULIC SUSPENSION FOR HARVESTING MACHINES

[75] Inventor: Gerald L. Claxton, Fresno, Calif.

[73] Assignee: Up-Right, Inc., Berkeley, Calif.

[21] Appl. No.: 79,503

[22] Filed: Sep. 27, 1979

[51] Int. Cl.³ .............................................. B60S 9/12
[52] U.S. Cl. .................................. 280/6 H; 172/395; 267/65 D; 280/709; 280/714
[58] Field of Search .................... 280/6 H, 112 R, 709, 280/714, 707, 6 R, 6.1, 6.11; 267/65 D, 65 R; 172/395

[56] References Cited

U.S. PATENT DOCUMENTS

| 3,909,022 | 9/1975 | Claxton | 280/112 R |
| 4,050,704 | 9/1977 | Duca | 280/714 |

Primary Examiner—John J. Love
Assistant Examiner—John A. Carroll
Attorney, Agent, or Firm—Phillips, Moore, Weissenberger, Lempio & Majestic

[57] ABSTRACT

A generally rectangular frame having a vertical support column at each corner thereof mounted for vertical movement relative to the frame. Four hydraulic rams, all of the same diameter and one for each support columns, are used are used to connect the frame to the columns, with the two rams at one end causng raising or lowering of the frames by contraction or extension of the rams while corresponding movement of the other end of the frame is caused by opposite movement of the rams thereat. A hydraulic control system selectively: raises or lowers the frame relative to all four columns, raises or lowers the frame relative to one side only of the frame, or or raises one side of the frame while lowering the other. Additionally, the system allows the columns at one end of the frame to move freely, in equal and opposite directions relative to the frames.

20 Claims, 9 Drawing Figures

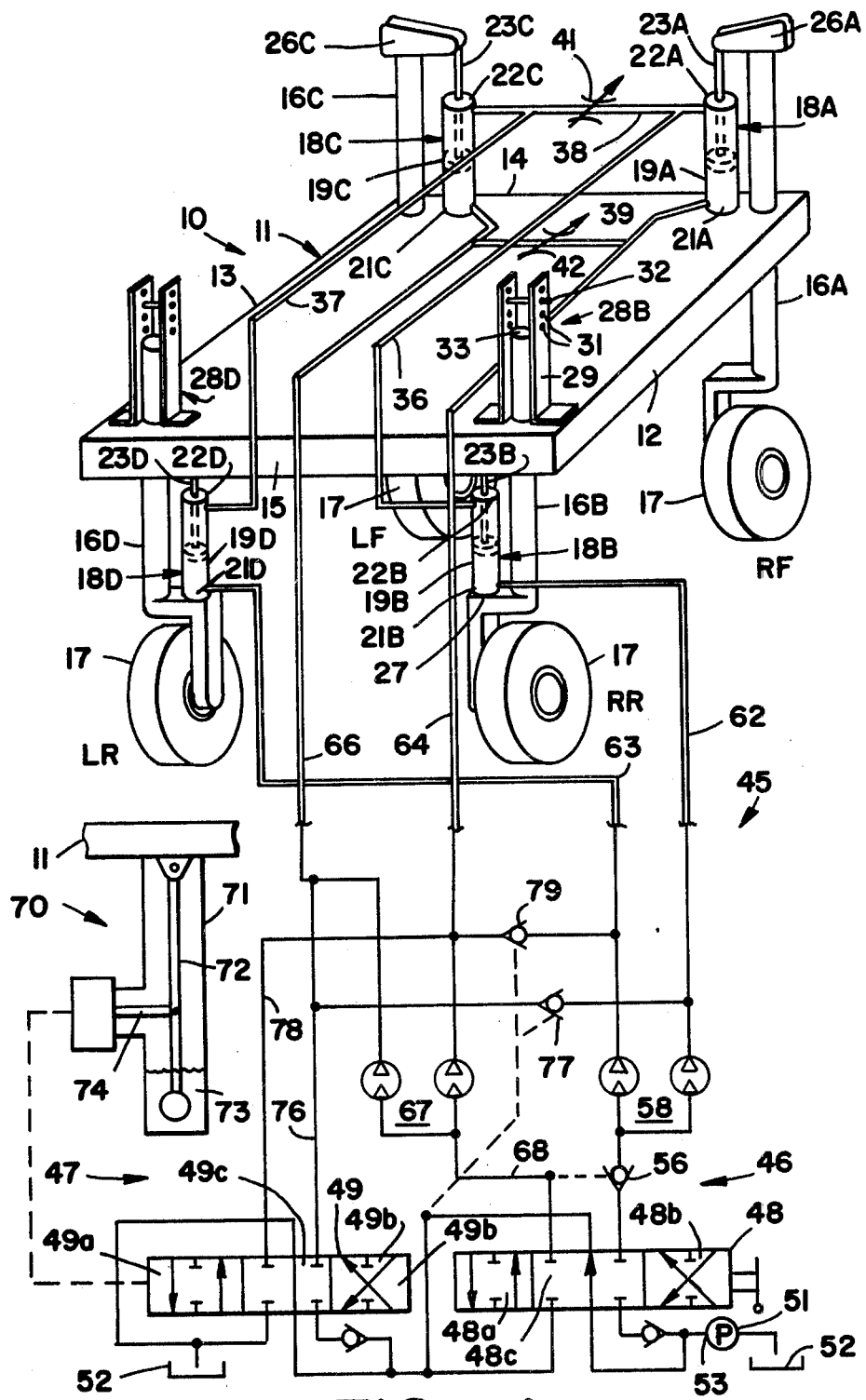
FIG_1

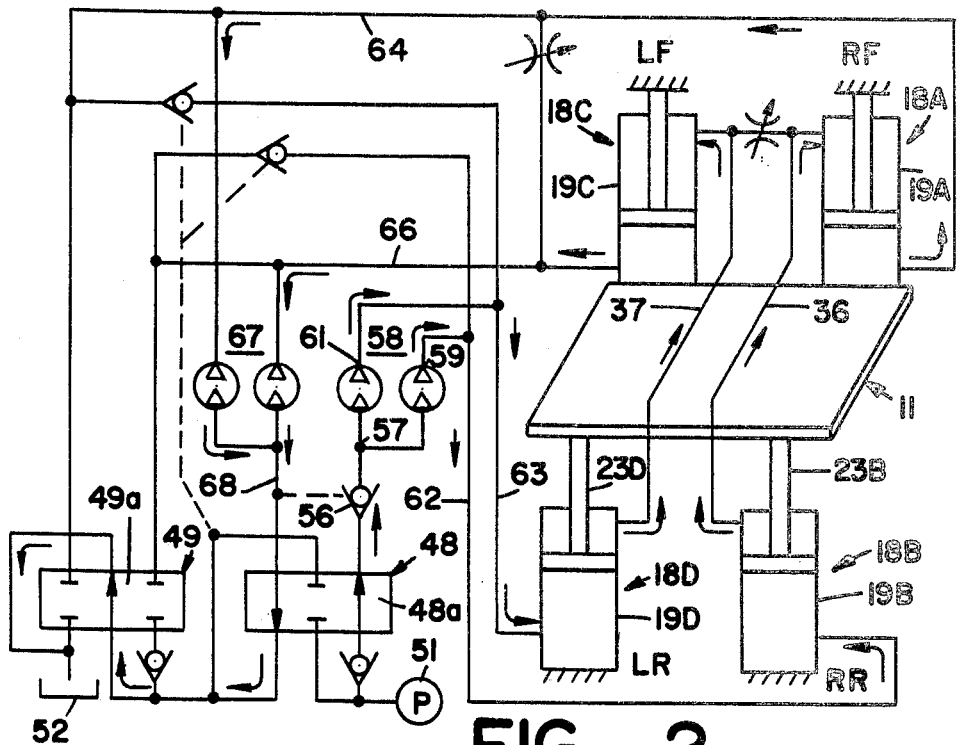
FIG_2
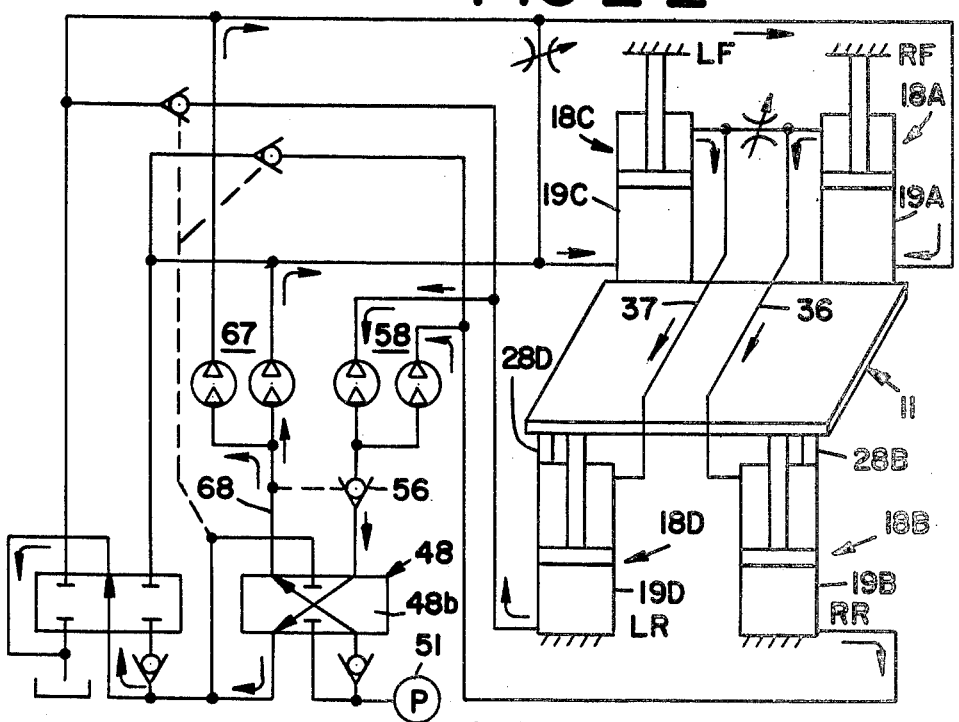
FIG_3

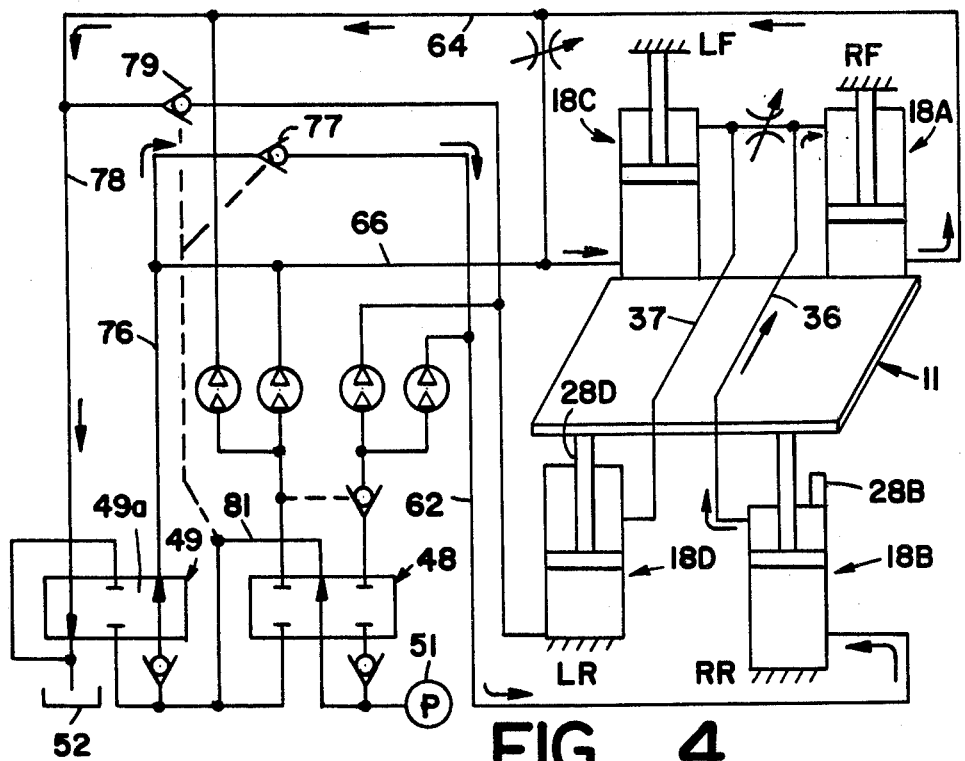
FIG_4
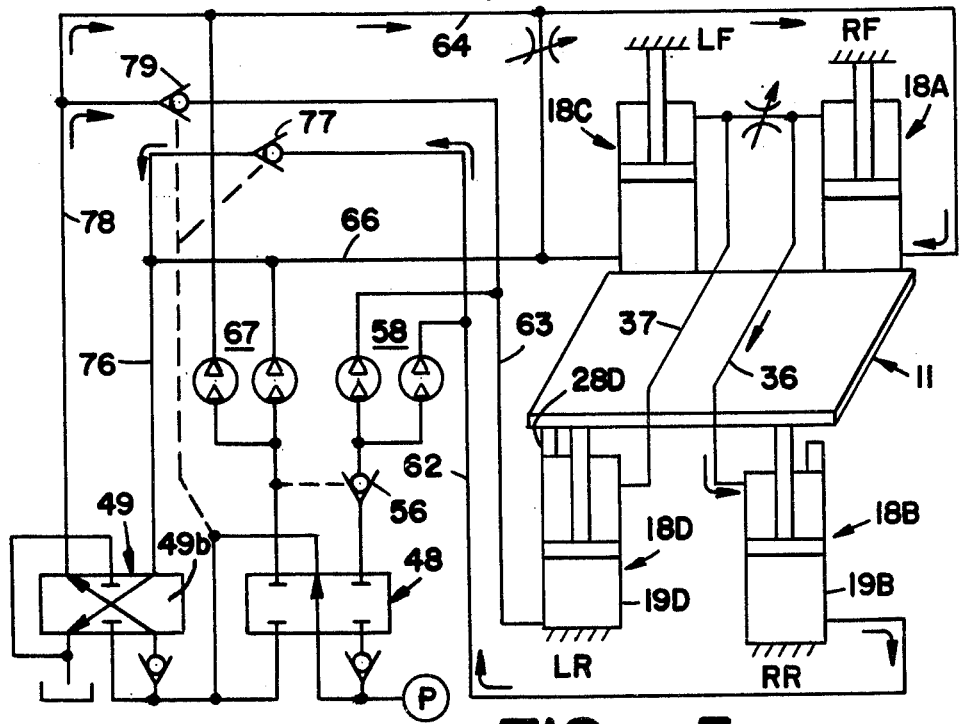
FIG_5

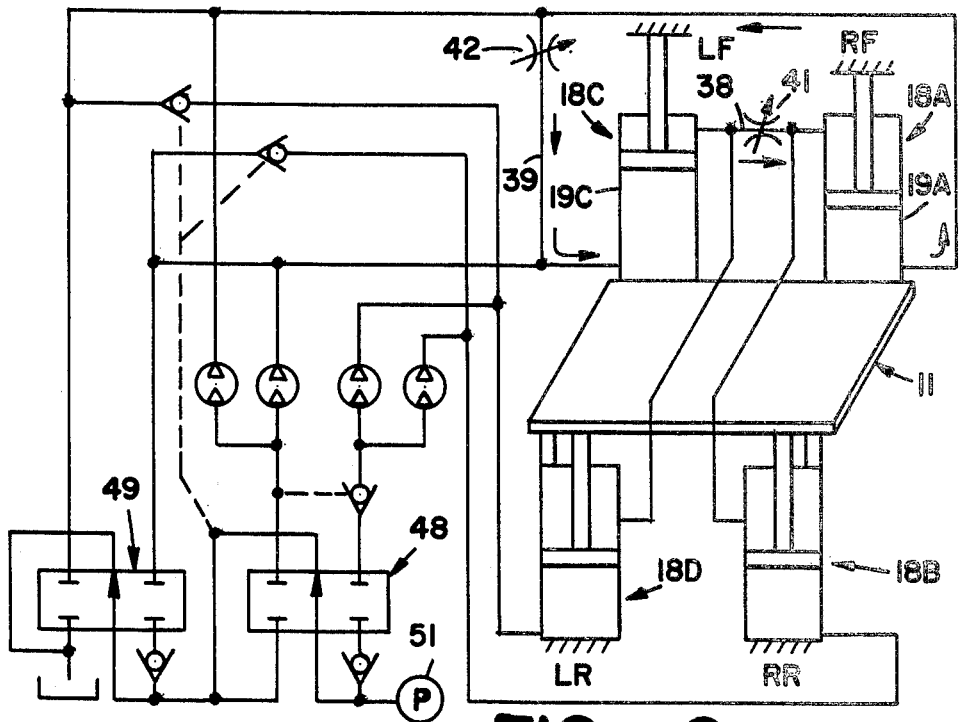
FIG_6
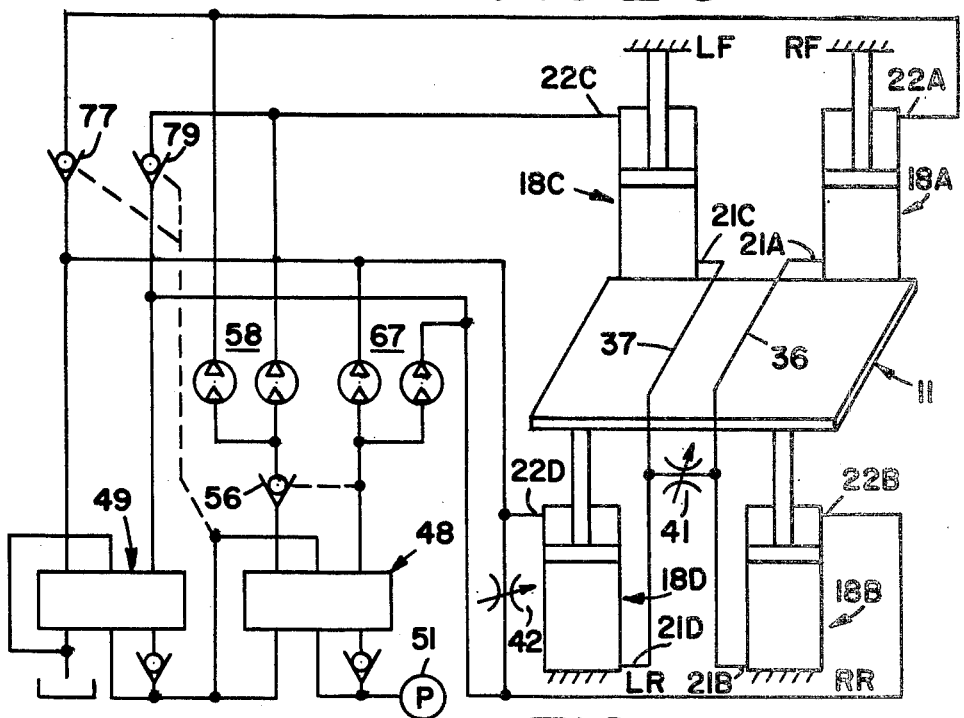
FIG_7

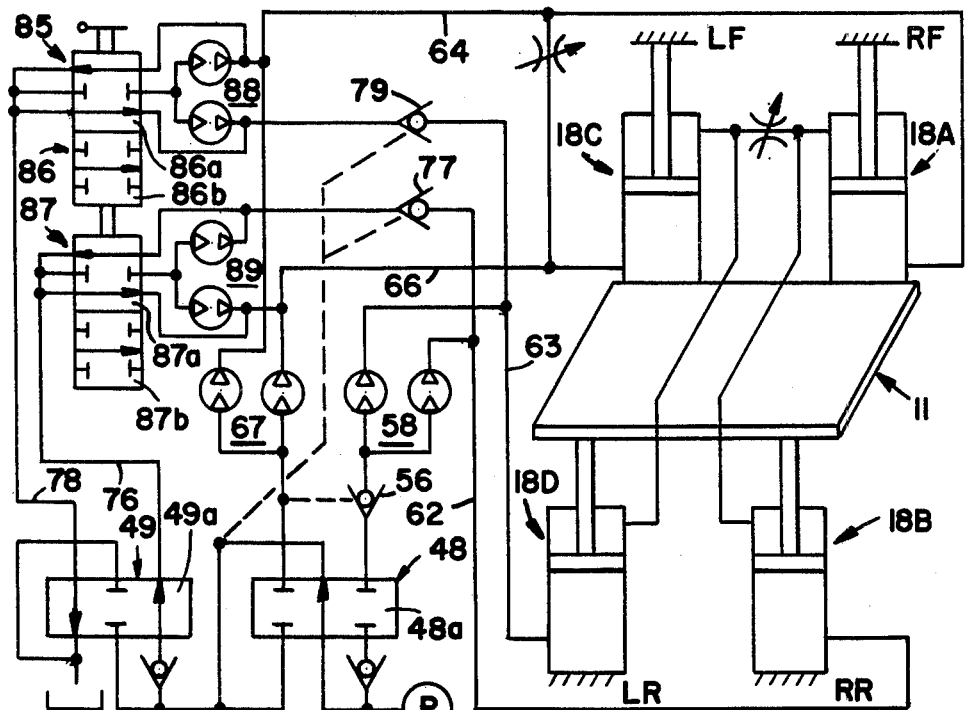
FIG_8
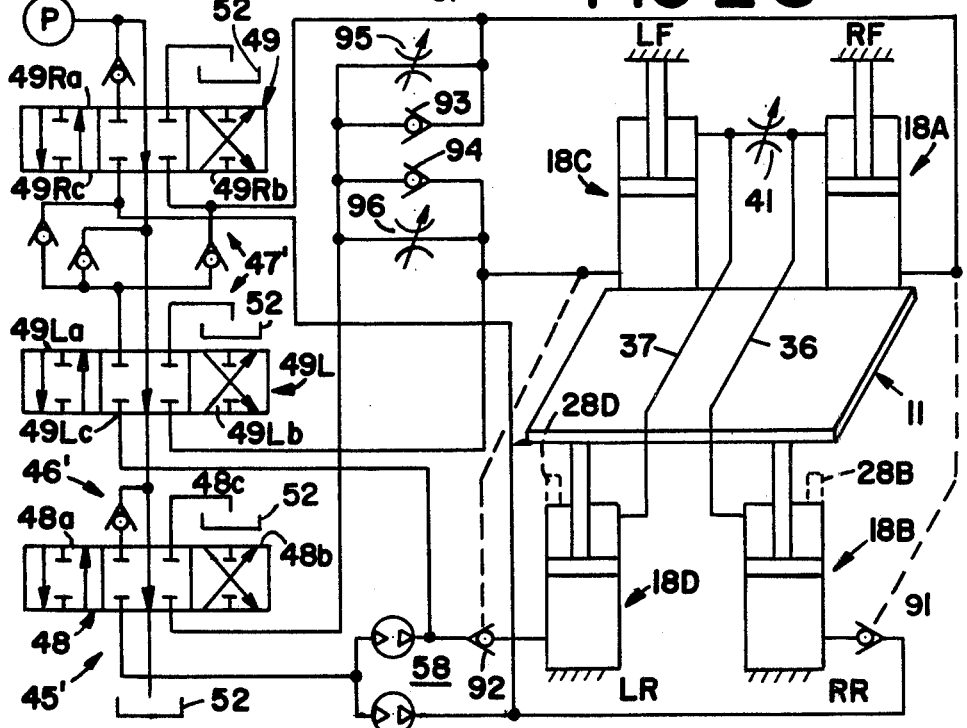
FIG_9

HYDRAULIC SUSPENSION FOR HARVESTING MACHINES

BACKGROUND OF THE INVENTION

Although its use is not limited thereto, the present invention has particular application to mechanical grape harvesters wherein a main frame is supported by wheeled columns at the four corners thereof, the harvester being adapted to straddle and move along a row of grape vines while a picking apparatus mounted on the frame agitates the vines, causing the fruit to be dislodged to fall into catchers and conveyors carried by the frame and disposed beneath the vines.

In order to provide optimal harvesting, such a harvester should have a number of attributes. First, it should have the capability of raising and lowering the frame relative to the ground so that the picking apparatus, catchers and conveyors carried by the frame can be properly positioned relative to the height of the vines. Secondly, it should have the capability of maintaining the frame level, from side-to-side thereof, as the harvester travels across the slope of the hill with its downhill wheels lower than the uphill wheels. In such case, it is desirable that the frame be maintained level on sloping terrain with the elevation of the frame above the uphill wheels being held constant. Since either side of the harvester can be the "uphill" side, depending upon the direction of travel across the slope, the harvester must be capable of maintaining the frame level relative to the uphill side regardless of which side is uphill. Further, it is desirable that the harvester be capable of maintaining the frame level with respect to the longitudinal centerline of the machine, when so desired.

Also, a harvester should have the capability of operating on rough ground, with the many ditches and bumps found in vineyards, with all four wheels maintained in firm ground engagement. Otherwise, if one wheel comes to a ditch and the frame is then supported only by the other three wheels, the one wheel with simply spin in the air and traction thereat will be lost. The same, of course, will occur if one wheel rides up on a bump so that the frame is again supported by only three wheels.

In my prior U.S. Pat. No. 3,909,022, issued Sept. 30, 1975, I have disclosed a cable suspension system for a harvesting machine which is capable of raising and lowering the frame relative to the wheeled columns, maintaining the frame level about its uphill side or the longitudinal centerline thereof, and capable of maintaining all four of the wheel columns on engagement with the ground in spite of unevenness of the ground.

In practice, however, the cable suspension system has evidenced two disadvantages—wear and breakage of the cables and inability of the front columns of the harvester to accomodate to an abrupt change in side slope. These disadvantages have been overcome in the present invention by use of a hydraulic suspension having a hydraulic ram at each of the wheeled columns and a control system therefor which provides all of the desired capabilities enumerated above.

SUMMARY OF THE INVENTION

The present invention provides a hydraulic ram at each wheeled column, the two rams at one end (e.g. the front end) being connected between the frame and the columns to raise or lower the frame upon contraction or extension, respectively, of the rams, while the two rams at the other end are connected between the frame and the columns thereat to raise or lower the frame by reverse ram movement, i.e., by extension or retraction respectively. The cylinder and rod diameter is the same for all four rams, and each pair of rams at the sides of the frame are connected in series with the head ends (or rod ends) or the cylinders being connected to each other. By virtue of this connection, hydraulic fluid expelled from one cylinder during contraction thereof will flow into the other cylinder to cause an equal amount of extension thereof.

A hydraulic control system causes raising of the frame by directing an equal amount of hydraulic fluid to both cylinders at one end of the frame, or lowering of the frame by releasing an equal amount of hydraulic fluid from both cylinders at the other end of the frame. The control system also levels the frame by raising or lowering the frame relative to the columns at one side only of the frame, for uphill leveling, or by raising one side of the frame while lowering the other for centerline leveling. Furher, the control system allows the two wheeled columns at one end of the machine to move freely in equal and opposite directions, relative to the frame, so that the wheels thereat will be maintained in firm ground engagement.

Other aspects of the invention will become apparent in the course of the following detailed description.

BRIEF DESCRIPTION OF THE DRAWINGS

In the drawings, forming a part of this application, and in which like parts are designated by like reference numerals throughout the same, FIG. 1 is a perspective and simplified view of a wheeled frame with a hydraulic suspension system in accordance with the present invention.

FIG. 2 is a simplified view of the frame and ram support therefor with the hydraulic control circuit of FIG. 1, showing fluid flow during raising of the frame.

FIG. 3 is similar to FIG. 2, showing fluid flow during lowering of the frame.

FIG. 4 is similar to FIG. 2, showing fluid flow during raising of the right side of the frame.

FIG. 5 is similar to FIG. 2, showing fluid flow during lowering of the right side of the frame after a raising thereof.

FIG. 6 is similar to FIg. 2 showing fluid flow during front wheel articulation.

FIg. 7 is similar to FIG. 2, but with the head ends of the cylinders being interconnected.

FIG. 8 is similar to FIG. 2, showing an alternate level control permitting selective leveling about the centerline of the frame, or leveling relative to the uphill side of the frame.

FIG. 9 is similar to FIG. 2 showing anotheralternate form of elevational and leveling control.

DESCRIPTION OF THE PREFERRED EMBODIMENTS

Referring now to FIG. 1, the wheeled frame apparatus 10 includes a generally horizontal, rectangular, rigid frame 11, with opposed sides 12 and 13 and opposed ends 14 and 15, and first, second, third and fourth vertical support columns 16A, 16B, 16C and 16D at each corner of the frame. The columns are each mounted for vertical sliding movement relative to frame 11 and each has a ground engaging wheel 17 at the lower end thereof. For convenience, the letters RF, RR, LF and LR are used in the drawings to designate the right front, right rear, left front and left rear of the apparatus.

Vertically-disposed, double-acting, hydraulic rams 18A, 18B, 18C, and 18D are provided to suspend and support the frame 11 from or on the support columns, each ram having a cylinder 19A-D with a head end 21A-D and a rod end 22A-D and a rod 23A-D extending from the rod end of the cylinder. The rams are identical in cylinder and rod diameter. Of importance to the present invention, the two rams at one end of the frame, e.g. rams 18A and 18C, are arranged to suspend the frame from the columns 16A and 16C so that the frame will be raised or lowered on these columns by ram contraction and ram extension, respectively, whereas the rams at the other end, e.g. rams 18B and 18D, will act in the opposite manner and raise of lower the frame upon ram extension and ram contraction respectively.

In particular, support column 16A has a cap 26A at the upper end thereof and extending outwardly therefrom, ram 18A having its rod 23A fixed to cap 26A and its cylinder 19A fixed to frame 11 so that the right front corner of the frame is suspended by ram 18A from the upper end of column 16A. The left front corner of the frame is likewise suspended by ram 18C from cap 26C on the upper end of the column 16C. Typically, the front columns 16A and 16C are also rotatable about their vertical axes so that the apparatus may be steered (by conventional steering linkage, not shown). Accordingly, the caps 26A and 26C will be suitably journaled on columns 16A and 16C so that the caps will not rotate with the columns but will move up or down therewith.

At the rear of the apparatus, ram 18B extends upwardly from a horizontal shelf 27 of column 16B to frame 11, so that the right rear corner of the frame is supported on column 16B by ram 18B. Ram 18D similarly supports the left rear corner of the frame on column 16D. Although rams 18B and 18D are specifically shown in FIG. 1 as having their cylinders fixed to the columns and their rods connected to the frame, one or both of these rams may be inverted, if desired, as long as the hydraulic connection to the head and rod ends of the cylinders remain the same. The same, of course, is true with respect to the rams 18A and 18C at the front end of the frame.

The rear columns 16B and 16D are preferably splined to the frame 11 so that they can move vertically relative to the frame but cannot rotate about their axes. A stop means 28B is provided to limit the amount of downward movement of the right rear corner of frame 11 on column 16B while allowing the frame to move upwardly relative to column 16B from the limit position. As illustrated in FIG. 1, the stop means 28B can comprise a pair of upstanding brackets 29 having a plurality of vertically spaced holes 31 and a pin 32 positioned horizontally in a desired set of holes 31. Thus, as ram 18B contracts, frame 11 can lower on column 16B until the pin 32 comes down into engagement with the upper end 33 of column 16B, at which time no further contraction of ram 18B can occur. Extension of the ram 18B will, of course, allow upward movement of frame 11 relative to column 16B (and subsequent downward movement of column 16B relative to frame 11) from the limit position set by pin 32. A stop means 28D is similarly provided at the left rear of the frame for column 18D.

Cylinders 19A and 19B of rams 18A and 18B comprise a first set of interconnected cylinders, on one side 12 of the frame, the rod ends 22A and 22B of these cylinders being interconnected by conduit 36. Likewise cylinders 19C and 19D comprise a second set of interconnected cylinders, on the other side 13 of the frame, the rod ends 22C and 22D of these cylinders being interconnected by conduit 37. For purposes of front wheel articulation, the rod ends 22A and 22C of cylinders 19A and 19C are interconnected by conduit 38 while conduit 39 interconnects the head ends 21A and 21C of these cylinders. Adjustable flow restrictors 41 and 42 are provided in conduits 38 and 39, respectively, to regulate the rate of hydrualic fluid flow therethrough.

The hydraulic control 45 includes an elevational control means 46 for selectively raising or lowering the frame relative to all four columns 16A-16D or maintaining the frame at a desired elevation relative to the columns, and a level control means 47 for raising or lowering one or both side of the frame relative to the columns thereat in order to maintain the frame level from side to side thereof. The particular hydraulic control shown in FIG. 1 utilizes a manually-operable, elevational-control valve 48 and a automatically-operable, level-control valve 49, each being a three-position, three-way valve. In general, the elevational control valve 48 has a first position 48a for connecting a source of pressurized hydraulic fluid, e.g. pump 51, to the head ends of the rear cylinders 19B and 19B, while connecting the head ends of the front cylinder 19A and 19C to the fluid exhaust sump 42. In its second position 48b, valve 48 will reverse the above connection of the cylinders to the pump and sump. In its third position 38C, valve 38 will block flow from the pump to the cylinders and from the cylinders to the pump. In general, the level control valve 49 has a first position 49 for connecting pump 51 to the head ends of the right rear and left front cylinders 19B and 19C while connecting the head ends of the right front and left rear cylinders 19A and 19D to sump 52. In its second position 49b, the above connections are reversed, while in its third position 49C, valve 49 will block flow from the pump to the cylinders and from the cylinders to the sump. Hydraulic pump 51 is preferably a pressure-demand pump and has its output 53 connected to sump 52 through valves 48 and 49 when they are both in their third position, i.e. as illustrated in FIG. 1, so that pump 51 will operate at low speed at such time. If either valve 48 or 49 is moved to either the first or second position thereof, the output of pump 51 can no longer discharge directly to the sump and the speed and output pressure of the pump will increase.

FIG. 2 illustrates the operation of the system during raising of the frame 11 with respect to all four support columns. The connection of the rams 18A-18D to the columns are represented in FIG. 2 as ground connections for purposes of simplicity, since all four columns will be in engagement with the ground and the ram connections to the columns will be at fixed heights relative to the ground.

If the operator wishes to raise the frame 11 relative to all four columns, he will move the elevational conrol valve 48 to its first position 48a, as shown in FIG. 2. Pressure fluid from pump 51 can now flow through valve 48, through piloted check valve 56 to inlet 57 of flow divider 58 to the two outlets 59 and 61 thereof and then through conduits 62 and 63 to the head ends of the right rear and left rear cylinders 19B and 19D. Flow divider 58 is conventional and will deliver one-half of the inlet flow to each of the outlets thereof, even though the back pressure of the two outlets may differ.

With the amounts of fluid entering the head ends of cylinders 19B and 19D being equal, and since these cylinders are of the same diameter, rods 23B and 23D will both move upwardly by an equal amount. The extension of ram 18B will force fluid from the rod end thereof through conduit 36 to the rod end of the right front cylinder 19A, causing ram 18A to contract by an amount equal to the extension of ram 18B. Likewise, the left front ram 18C will contract by an amount equal to the extension of ram 18D. As a consequence, all four corners of the frame will be raised by an equal amount.

As rams 18A and 18C contract, fluid will be forced from the head ends thereof and will flow through conduits 64 and 66, equally through flow dividers 67 and conduit 68, then through valve 48 to sump 52.

When the frame 11 has been raised to the level desired by the operator, he will move the level control valve back to its first position 48c (shown in FIG. 1) to block flow to or from the head ends of the cylinders of the four rams.

The piloted check valve 56 functions as a normal check valve unless piloted to open position in response to a predetermined high pressure in conduit 68. Since the load of the frame on the front rams 18A and 18C is imposed on the fluid in the rod ends of cylinders 19A and 19C, the pressure in the head ends of those cylinders will be relatively low and insufficient to pilot the check valve 56 to open position. As a consequence, check valve 56 will block flow from the head ends of the rear rams 18A and 18d (which are pressure by the weight of the rear of frame 11) and prevent leakage through valve 48 when it is in its thrid position 48c.

When the operator wishes to lower the frame 11, he will move the elevational control valve to its second position 48b, as shown in FIG. 3. Pump pressure is now present in conduit 68 and as soon as it has built up enough to cause piloted check valve 56 to open, fluid will be released from the rear rams 18B and 18D equally through flow divider 58 and valve 48 to sump 52. Such release will cause the rear rams 18B and 18D to contract, and by equal amounts, so that the rear of the frame will be lowered. As the rear rams contract, the volumes of their rod ends will increase and the pressure in the rod ends of the front rams 18A and 18C will cause fluid to flow therefrom, through conduits 36 and 37, to the rod ends of the rear rams 18B and 18D. The resulting extension of the front rams will be equal to the retraction of the rear rams so that all four corners of the frame are lowered by equal amounts.

Make-up fluid will flow through flow divider 67 to the head ends of the front rams 18A and 18C. As such make-up fluid flows into the head ends of the front rams, (which are at low pressure) the pressure in conduit 68 will drop, causing piloted check valve 56 to close and block flow from the rear rams. When the pressure in conduit 68 again increases and causes check valve 56 to open, more fluid will be released from the rear rams. Thus, the piloted check valve 56 will provide a control over the rate of lowering of the frame, and will insure that the front rams are maintained full of hydraulic fluid.

The piloted check valve 56 also has a further function of preventing the frame from being lowered unless the pump pressure is available. Thus, the operator cannot cause the frame to be lowered unless the system is also operable to allow the frame to be raised.

When the apparatus 10 is used as the frame for a fruit harvester which straddles and moves along a row of plants, such as in a vineyard, it is desirable to adjust the height of the frame 11 relative to the wheeled support columns 16A–16D so that the fruit collectors and conveyors carried by the frame will be as low to the ground as possible but will still be held spaced thereabove enough so as to avoid damage to the equipment from inadvertant contact with the relatively rough ground over which the harvester will travel. Thus, when the height of the frame has been adjusted for the minimum desired ground clearance of the collectors and conveyors, the pins 32 of the stop means 28B and 28D will be set to limit the amount of lowering of the frame on columns 16B and 16D. For simplicity, the stop means 28B and 28D are shown in FIG. 3–6 as upward projections on the rear cylinders 19B and 19D which are positioned to engage the undersurface of frame 11 and stop relative downward movement of the frame at a point determined by the height of the projections.

Although the stop means 28B and 28D will serve to prevent the operator from accidentally lowering the frame so that the collectors and conveyors will be forced downwardly against the ground, the primary purpose for the stop means is to provide for leveling the frame about the uphill side thereof as the apparatus moves across the slope of a hill. In such case, it is desirable to maintain the frame 11 at the minimum height determined by the stop means 22B or 22D on the uphill column so that it will be held above ground contact, and to move the donwhill columns downwardly relative to the frame so that the frme is maintained level from side to side thereof.

Referring back to FIG. 1, the level control 47 includes a level detection apparatus 70 having a vertical tube 71 fixed to frame 11 and having a pendulum 72 therein, the lower end of which is disposed in a damping fluid 73. The level detection apparatus 70 is oriented to the frame so that if the frame tilts from side to side thereof, pendulm 72 will cause horizontal movement of link 74 and movement of level control valve 49 from its third (or level) position 49c to either its first or second position 49a or 49b, depending on the direction of tilt.

Suppose that the apparatus 10 has been traveling along level ground and now progresses across a slope wherein the left side is uphill and the right side is downhill. As soon as the level detection apparatus 70 senses that the frame has tilted from horizontal, with the right side down, the level control valve 49 will be shifted to its first position 49a, as illustrated in FIG. 4.

With the direct passage to sump 52 though valve 49 now blocked, the pressure of pump 51 will increase and cause fluid to flow through valve 49 to conduit 76 and through piloted check valve 77 to conduit 62 and thence to the head end of the right rear ram 18B to cause extension thereof and a consequent and equal retraction of the right front ram 18A, fluid being released from the head end of the right front ram 18A through conduits 64 and 78 and valve 49 to sump 52. The extension of ram 18B and contraction of ram 18A will raise the right side of rame 11 relative to the right side columns 16A and 16B so that the frame is brought back to level.

It will be noted that conduit 76 is also connected, through conduit 66, to the head end of the left front ram 18C and that the head end of the left rear ram 18D is connected to the sump through the piloted check valve 79 (which has been piloted to open position by the pressure present in conduit 81 through which pressure fluid from pump 51 is delivered to the level control valve 49). However, no fluid will flow into ram 18C or from ram 18D because the stop means 28D is in engagement with the frame 11 and prevents further contraction of ram 18D. Since ram 18D cannot contract, ram 18C cannot extend.

When the frame 11 again becomes level, from side to side thereof, pendulum 72 will move link 74 so that the level control valve shifts back to its third position. The apparatus will now be such that the left side of the frame will be supported on the uphill columns with the minimum ground clearance determined by step member 28D, the frame will be level from side to side thereof and the right side columns will have been lowered relative to the frame.

Assume now that the slope of the ground decreases. Since the right side columns have been extended, the frame will now tilt to the left and the level control valve 49 will be shifted to its second position 49b, as illustrated in FIG. 5.

With a build up of pump pressure, check valves 77 and 79 will both be piloted open. With check valve 77 open, fluid will be released from the head end of the right rear ram 18B through check valve 77 and valve 49 to the sump so that ram 18B starts contracting. Because of the fluid connection 36 between the right side rams 18A and 18B, ram 18A will extend (and by an equal amount) as ram 18B contracts, so that the right front and right rear corners of the frame will lower equally relative to the ground. Fluid from the pump will flow through valve 49 and conduits 78 and 64 to supply make-up fluid to the head end of ram 18A as it extends. Although pump pressure is also supplied, through check valve 79, to the head end of the left rear ram 18D, such pressure will be low (since little pressure is required to supply make-up fluid to ram 18A) and insufficient to cause ram 18D to extend and lift the weight of the frame 11. Accordingly, the right side of the frame moves downwardly on the now raised columns 16A and 16B while the left side remains at the minimum height set by stop member 28D. This action will continue until the frame is again level.

If the apparatus had come back to level ground, leveling as above described would continue until the stop means 28B again engages the frame.

If the apparatus had instead gone to a reversely sloped hill, so that the left side 13 of the frame 11 is now the donwhill side, the right side 12 will lower on the right side columns unitl stopped by stop means 28B. Since the frame would still be reversely tilted, the level valve 69 will remain in its second position 69C. With ram 18B now prevented from further retraction by stop member 28B, the pump pressure will build up sufficiently to cause extension of the left rear ram 18D and consequent retraction of the left front ram 18C so that the left side of the frame will be raised relative to columns 16C and 16d until the frame does become level again.

As is apparent from the above, since one side of a tilted frame will lower (if raised above the stop means at that side) before the other side can be raised, the leveling system will automatically maintain the uphill side of the frame at the elevation determined by the uphill stop means 28B or 28D while adjusting the height of the downhill side of the frame relative to the downhill columns, as the slope changes in degree or direction.

Also as is apparent from the foregoing, the frame will be maintained by controlling the fow of pressure fluid into one of the rear rams 18B or 18D or the release of fluid therefrom, with the extension or retraction of these rams causing a slaved and opposite retraction or extension of the front end rams 18A and 18C with which they are interconnected. Once the frame is leveled with respect to the rear columns 16A and 16B, it will remain fixed relative to those columns (as long as the relative height of the rear wheels does not change) since the head ends of rams 18B and 18C are individually blocked from introduction of fluid thereinto or from release of fluid therefrom when the elevational control and level control valve 48 and 49 are in their third position.

On the other hand, the front end rams 18A and 18C are interconnected by conduits 38 and 39, for front wheel articulation, wherein one front end column can move up (or down) relative to the frame while the other front end column moves down (or up) relative to the frame by a corresponding amount.

Front wheel articulation is important in that it allows all four wheel to remain in firm ground engagement in spite of unevenness of the ground, with the weight of the frame borne on all four columns. Without such artiuclation, one of the wheels could be suspended above ground with consequent loss of traction.

FIG. 6 illustrates the functioning of the system wherein the frame 11 is being held level by the operation of the rear end rams 18B and 18D and the right front wheel comes over a ditch, or other ground depression. As soon as the right front wheel loses contact with the ground, the weight of the front of the frame will be borne solely by the left front ram 18C. The consequent higher rod end pressure in ram 18C will force fluid therefrom, through conduit 38 and restirctor 41 into the head end of cylinder 19A. This in turn will cause fluid to be forced from the head end of cylinder 19A through conduit 39 and flow restrictor 42 to the head end of cylinder 19C. Such circulation of fluid, will cause ram 18C to extend and ram 18A to contract with the extension and contraction being equal in amount, due to the cylinders 19A and 19C being connected head end to head end and rod end to rod end.

As a consequence, the frame will lower relative to the left rear column while the front right column will be lowered relative to the frame. The downward movement of the front right column into the ditch will continue until the wheel engages the bottom of the ditch and the loads on the two front rams are equalized. If the ditch is six inches deep, the front end of the frame will be lowered three inches. (Such lowering of the front end of the frame will not affect the level control valve 49, since the level detection apparatus will only respond if the frame tilts from side to side thereof.)

As the right front wheel climbs out of the ditch, the load on ram 18A increase, causing a reverse circulation between the front end rams 18A and 18C and opposite movement of columns 16A and 16C relative to the frame.

The flow restrictors 41 and 42 restrict the flow between the front end rams 18A and 18C during such articulation to provide a suitable damping to prevent machine oscillation that might otherwise occur with the present hydraulic suspension.

If now the apparatus proceeds along until the right rear wheel comes to the same ditch, the right rear wheel will descend thereinto, causing the frame to tilt. The rigid frame will also tilt at the front end thereof, but the front wheel articulation will cause the two front columns to remain in firm ground engagement. With the frame now being tilted, the level control system will regard the right rear wheel as the downhill wheel and will cause the right rear ram 18B to extend so that the frame is brought back to level, without any lowering thereof relative to the ground. Assuming the same six inch deep ditch, the right rear ram 18B will have extended six inches. Because of the front wheel articulation interconnection of ram 18A and 18C, such movement of ram 18B will cause each of the front end rams 18A and 18C to retract three inches so that front end of the frame will be lowered by three inches relative to the ground when the right rear wheel is in the ditch.

In the suspension system illustrated in FIG. 1 and discussed in connection with FIGS. 2-6, the rod ends of first and second side sets of cylinders 19A-19B and 19C-19D are interconnected. If desired, the head ends of these sets of cylinders could be interconnected by conduits 36 and 37, as shown in FIG. 7. With such arrangement, the front end rams 18A and 18C would be then used to control the leveling of the frame while the rear rams 18B and 18D would provide for articulation and the control circuits would have to be somewhat revised as shown in FIG. 7. As shown, the system of FIG. 7 will provide for raising and lowering of the frame in response to operation of the elevational control valve 48 and for leveling in response to operation of the level control valve 49, as well as for articulation of the rear wheels, all as previously described.

Although the system of FIG. 7 provides the same functions, it is as not as preferred as the system of FIG. 1 for two reasons. First, in the system of FIG. 7, the pressure in the rod end of cylinder 19A, will be a function of the weight of the right front end of the frame suspended by ram 18A plus the pressure in the head end of cylinder 19A which is imposed from rear ram 18B and is a function of the weight supported by the rear ram. Thus, the pressure in the rod end of each of the front end cylinders 19A and 19C will be a function of about half the weight of the frame 11. By way of contrast, the rod end pressures in any of the rams 18A-18D is a function of only a quarter of the total weight load of the frame. As a consequence, the higher rod end pressures of rams 18A and 18C will increase leakage problems by the rod end seals.

Further, since the rod end areas are smaller than the head end areas by the area of the rods therein, a higher pump pressure is required to produce the same force output.

As described above, the leveling circuit of FIG. 1 provides for leveling the frame relative to the uphill side of the frame, a leveling which is particularly useful for row harvesting equipment. The present invention is easily adaptable to centerline leveling, i.e., leveling of the frame wherein the downhill side is raised and the uphill side is lowered, with the longitudinal centerline of the frame remaining at the same elevation with respect to the ground. For example, the control circuit of FIG. 1 can be modified as shown in FIG. 8.

The circuit of FIG. 8 differs from that of FIG. 1 in that an operator-controlled, leveling-mode, selector valve 85 is provided, such valve having two valve portions 86 and 87 ganged together for movement between positions 86a,87a and 86b,87b. When the selector valve 85 is in the uphill leveling position 86a,87a shown in FIG. 9, conduit 76 from level control valve 49a is connected by valve position 87a to conduit 66 and piloted check valve 77, while conduit 78 is connected by valve position 86a to conduit 64 and piloted check valve 79. As will be noted, this is the same arrangement as shown in FIG. 4, and if the level control valve 49 is in its first position 49c, again as in FIG. 4, the frame will level about the left, or uphill side of the frame, in the same manner as described in connection with FIG. 4, providing that the stop means 28B and 28D are used.

If it is desired to operate the system with centerline leveling, the selector valve 85 is moved to the centerline-leveling-mode position 86b,87b, so that conduits 78 and 76 from the level control valve 49 are now connected to the inlets of flow dividers 88 and 89 respectively. (In centerline leveling, the stop means 20B and 28D are not used.)

If the level control valve 49 has moved to its first position 49a, pressure fluid from pump 51 will now flow through flow divider 89, with half the flow going to the right rear ram 18B to cause extension thereof and the other half of the flow going to the left front ram 18C as make-up fluid. The extension of the right rear ram 18B will cause contraction of the right front ram 18A with flow therefrom through one-half of the flow divider 88 to the sump. At the same time, the fluid under pressure in the left rear ram 18D is released through the piloted-open check valve 79 and the other half of flow divider 88 to the sump.

The flow dividers 88 and 89 will thus function so that the right rear ram 18B will extend simultaneously with a contraction of the left rear ram 18D, and by equal amounts, so that the right side of the frame will be raised relative to the right side column, while the left side of the frame is lowered relative to the left side columns.

When the frame is again level, the level control valve 49 will shift automatically to its third position 49c to prevent further movement of the rear rams 18B and 18D. As is apparent, if the frame tilted in the opposite direction, the left side of the frame would be raised concurrently with a lowering of the right side, so that the centerline of the frame remains at the same height relative to the ground.

The hydraulic control system 45', shown in FIG. 9 illustrates a modification which, as before, allows the frame to be raised or lowered relative to all four columns, allows front wheel articulation, and enables the frame to be leveled relative to the uphill side of the apparatus. Such uphill leveling may be accomplished with or without the stop members 28B and 28D, depending on the manner in which the level control valves 49R and 49L are used for leveling.

The elevational control means 46' utilize the same three-positions, three-way valve 48 as before. To raise the frame 11, valve 48 is moved to its first position 48c so that hydraulic fluid from pump 51 will flow through flow divider 58 and equally through piloted check valves 91 and 92 to the head ends of the rear rams 18B and 18D. Valve 48 will, at the same time, connect the head ends of the front rams 18A and 18C for fluid flow through check valves 93 and 94, respectively, and valve 48 to sump 52.

To lower the frame, valve 48 is moved to its position 48b, so that pump fluid will flow through flow restrictors 95 and 96 to the front rams 18A and 18C, respectively. The pressure of such fluid will pilot the piloted check valves 91 and 92 open, allowing hydraulic fluid in the head ends of the rear rams 18B and 18D to flow equally through flow divider 58 and valve 48 to sump 52.

Front wheel articulation, whereby one of the front rams 18A and 18C can contract in response to the extension of the other, and vice versa, is enabled by the interconnection of the rod and head ends of these rams. Flow between the rod ends will take place through flow restriction 41. Flow from the head end of ram 18A to the head end of ram 18C will take place through check valve 93 and flow restrictor 96, while reverse flow between the head ends of these rams will take place through check valve 94 and flow restrictor 95.

The level control means 47' utilizes two, three-position, three-way valves 49R and 49L, for separate control of the rams on the right and left side, respectively, of the frame. Valve 49R will selectively: connect pump 51 through piloted check valve 91 to the head end of the right rear ram 18B and connect the head end of the right front ram 18A to sump 52 (for raising of the right side of the frame) when valve 49R is in its first position 49Rb; connect pump 51 to the head end of the right front ram 18A and connect the head end of the right rear ram 18B to sump 52 (for lowering of the right side of the frame) when valve 49R is in its second position 49Ra; or block the head ends of the right side rams 18A and 18B from the pump and sump when the valve is in its third position 49Rc.

In like manner, level-control valve 49L will connect the head ends of the left front and rear rams 18C and 18D to the pump and sump, or block such connection, to raise, lower or maintain the elevation of the left side of the frame dependent upon which of the three positions, 49La, 49Lb or 49Lc of the valve 49L is selected for use.

In operation, the operator will adjust the height of the frame 11 by the elevation-control valve 48 to give the desired minimum ground clearance of the harvesting mechanisms suspended from the frame. If the apparatus is driven across a slope and the left side is uphill, the left side leveling valve 49L is maintained in its third position 49Lc, so that the elevation of the left side of the frame remains fixed relative to the ground, and valve 49R is actuated to raise or lower the right side of the frame relative to the right side wheels so that the frame is kept level.

Conversely, if the apparatus is operating on a slope such that the right side of the frame is uphill, the right side leveling valve 49R will be maintained in its third position 49Rc, with the left side leveling valve 49L being used to raise or lower the left side of the frame as needed to keep the frame level.

Since the elevation of the uphill side of the frame is maintained constant, the stop members 28B and 28D are not needed. However, they can be used, if desired, to insure that the uphill side of the frame is not lowered inadvertently below the minimum desired height.

If desired, the right and left level control valves 49R and 49L may be manually-controlled by the operator. If the control valves are to be actuated in automatic response to a level sensor, suitable disabling means should be provided so that only the downhill side valve 49R or 49L will be actuated, with the uphill side valve being maintained in its blocking position.

If desired, the right and left level control valves 49R and 49L can be connected for concurrent operation, with the right side valve 49R being moved to its first position to raise the right side, and the left side valve 49L moved to its second position to lower the left side of the frame, or vice versa. Check valves 97, 98 and 99 provide pump pressure to the left-side, leveling valve 49L for raising or lowering the left side, regardless of the position of the right-side, leveling valve 49R. In such event, stop members 28B and 28D would then be used to maintain a minimum height of the frame. The fluid connections between the head ends of the four rams and the pump and sump will then be as discussed in connection with FIGS. 4 and 5, and uphill leveling will occur in the same manner.

I claim:

1. A hydraulic suspension system for an apparatus having a generally horizontal, rectangular frame, with opposed sides and first and second opposed ends and first, second, third, and fourth vertical support columns, each column being movable vertically relative to the frame and having a ground engaging member at the lower end thereof, said first and second columns being at one side of said frame, said third and fourth columns being at the other side of said frame, said first and third columns being at one end of said frame and said second and fourth columns being at the other end of said frame, said hydraulic suspension system comprising:

first, second, third and fourth double-acting, vertically-disposed, hydraulic rams, said rams having first, second, third, and fourth cylinder members, respectively, each cylinder member having head and rod ends, each ram having a rod member extending from the rod end of the cylinder member thereof, said rams each having equal diameter cylinder members and equal diameter rod members, one member of each ram being connected to said frame, means for connecting the other members of said first and third rams to said first and third columns, respectively, for raising and lowering said frame relative to said first and third columns upon contraction and extension, respectively, of said first and third rams, means for connecting the other members of said second and fourth rams to said second and fourth columns, respectively for raising and lowering said frame relative to said second and fourth columns upon extension and contraction, respectively, of said second and fourth rams, a first conduit fluidly connecting one end of said first cylinder member to the corresponding end of said second cylinder member, said first and second cylinder members thereby comprising a first set of interconnected cylinders, a second conduit fluidly connecting one end of said third cylinder member to the corresponding end of said fourth cylinder member, said one end of said third cylinder member corresponding to said one end of said first cylinder member, said third and fourth cylinder members thereby comprising a second set of interconnected cylinders, third and fourth conduits fluidly connecting the rod ends and head ends, respectively, of the two cylinder members at said first end of said frame, a source of pressurized hydraulic fluid, a fluid exhaust sump, elevational control means for selectively:

(a) concurrently connecting the other ends of both of the first and third cylinder members to said fluid source while connecting the other ends of both of the second and fourth cylinder members to said sump, (b) concurrently connecting the other ends of both of the second and fourth cylinder members to said fluid source while connecting the other ends of both of the first and third cylinder members to said sump, (c) blocking fluid communication of all of said cylinder members with said fluid source and said sump, level control means for selectively:

(a) connecting the other end of said first cylinder member to said fluid source while connecting the other end of said third cylinder member to said sump, (b) connecting the other end of said third cylinder member to said fluid source while connecting the other end of said first cylinder member to said sump, (c) connecting the other end of said second cylinder member to said fluid source while connecting the other end of said fourth cylinder member to said sump, (d) connecting the other end of said fourth cylinder member to said fluid source while connecting the other end of said second cylinder member to said sump, (e) blocking fluid communication of the other ends of said first and third cylinder members with said fluid source and said sump, (f) blocking fluid communication of the other ends of said second and fourth cylinder members with said fluid source and said sump.

2. A hydraulic suspension system as set forth in claim 1, wherein said elevational control means includes a flow divider means for delivering hydraulic fluid from said fluid source equally to the other ends of the two cylinder members at said second end of said frame and for releasing hydraulic fluid to said sump equally from said other ends of said two cylinder members.

3. A hydraulic suspension system as set forth in claim 1, and further including piloted check valve means for: allowing fluid from said fluid source to flow to the other end of the cylinder member of said first set which is at said second end of the frame and for preventing fluid flow from said other end of said cylinder member to said sump except when the fluid pressure at the other end of the other cylinder member of said first set is above a predetermined value; and allowing fluid from said fluid source to flow to the other end of the cylinder member of said second set which is at said second end of the frame and for preventing fluid flow from said other end of said cylinder member to said sump except when the fluid pressure at the other end of the other cylinder member of said second set is above a predetermined value.

4. A hydraulic suspension system as set forth in claim 3, wherein said elevational control means includes a flow divider means for delivering hydraulic fluid from said fluid source equally to said other ends of said two cylinder members at said second end of said frame and for releasing hydraulic fluid to said sump equally from said other ends of said two cylinder members.

5. A hydraulic control system as set forth in claim 3 wherein said source of pressurized hydraulic includes a pressure-demand pump.

6. A hydraulic control system as set forth in claim 5 and further including:

first stop means for setting the minimum height to which said frame may be lowered relative to one of said columns at said second end of said frame, second stop means for setting the minimum height to which said frame may be lowered relative to the other of said columns at said second end of said frame.

7. A hydraulic suspension system according to claim 1, wherein said first and third rams extend upwardly from said frame and are connected to said first and third columns above said frame and wherein said second and fourth rams extend downwardly from said frame are connected to said second and fourth columns below said frame.

8. A hydraulic suspension system for an apparatus having a generally horizontal rectangular frame with opposed sides and opposed ends and first, second, third and fourth vertical support columns, each column being movable vertically relative to the frame and having a ground engaging member at the lower end thereof, said first and second columns being at one side of said frame, said third and fourth columns being at the other side of said frame, said first and third columns being at one end of said frame and said second and fourth columns being at the other end of said frame, said hydraulic suspension system comprising:

first, second, third and fourth double-acting, vertically-disposed, hydraulic rams, said rams having first, second, third and fourth cylinder members, respectively, each cylinder member having head and rod ends, each ram having a rod member extending from the rod end of the cylinder member thereof, said rams each having equal diameter cylinder members and equal diameter rod members, one member of each ram being connected to said frame, means for connecting the other members of said first and third rams to said first and third columns, respectively, for raising and lowering said frame relative to said first and third columns upon contraction and extension, respectively, of said first and third rams, means for connecting the other members of said second and fourth rams to said second and fourth columns, respectively for raising and lowering said frame relative to said second and fourth columns upon extension and contraction, respectively, of said second and fourth rams, a first conduit fluidly connecting the rod ends of the first and second cylinder members, a second conduit fluidly connecting the rod ends of the third and fourth cylinder members, third and fourth conduits fluidly connecting the head ends and rod ends, respectively, of said first and third cylinder members, a source of pressurized hydraulic fluid, a fluid exhaust sump, level control means for selectively:

(a) concurrently connecting said fluid source to the head ends of said first and fourth cylinder members while connecting the head ends of said second and third cylinder members to said sump, (b) concurrently connecting said fluid source to the head ends of said second and third cylinder members while connecting the head ends of said first and fourth cylinder members to said sump, (c) blocking fluid communication of the head ends of all of said cylinders with said fluid source and said sump.

9. A hydraulic suspension system as set forth in claim 8 and further including an adjustable flow restrictor in each of said third and fourth conduits.

10. A hydraulic suspension system as set forth in claim 8 and further including piloted check valve means for:
(a) allowing fluid from said fluid source to flow to the head end of said second cylinder member and preventing fluid to flow from said head end of said second cylinder member to said sump except when the fluid pressure at the head end of said first cylinder member is above a predetermined pressure;
(b) allowing fluid from said fluid source to flow to the head end of said fourth cylinder member and preventing fluid to flow from said head end of said fourth cylinder member to said sump except when the fluid pressure at the head end of said third cylinder member is above a predetermined pressure.

11. A hydraulic suspension system as set forth in claim 8 and further including:
first stop means for setting the minimum height to which said frame may be lowered relative to said second column,
second stop means for setting the minimum height to which said frame may be lowered relative to said fourth column.

12. A hydraulic suspension system as set forth in claim 11 wherein said source of pressurized hydraulic fluid includes a pressure-demand pump, and further including piloted check valve means for:
(a) allowing fluid from said pump to flow to the head end of second cylinder member and preventing fluid to flow from said head end of said second cylinder member to said sump except when the fluid pressure at the head end of said first cylinder member is above a predetermined pressure;
(b) allowing fluid from said pump to flow to the head end of said fourth cylinder member and preventing fluid to flow from said head end of said fourth cylinder member to said sump except when the fluid pressure at the head end of said third cylinder member is above a predetermined pressure.

13. A hydraulic suspension system as set forth in claim 8, wherein said level control means includes flow divider means for:
(a) delivering hydraulic fluid equally to the head ends of said first and fourth cylinder members and releasing hydraulic fluid equally from the head ends of said second and third cylinder members when said head ends of said first and fourth cylinder members are concurrently connected to said source of fluid pressure and said head ends of said second and third cylinder members are concurrently connected to said sump;
(b) delivering hydraulic fluid equally to the head ends of said second and third cylinder members and releasing fluid equally from the head ends of said first and fourth cylinder members when said head ends of said second and third cylinder members are concurrently connected to said fluid pressure source and said head ends of said first and fourth cylinder members are concurrently connected to said sump.

14. A hydraulic suspension system as set forth in claim 8 and further including:
elevational control means for selectively:
(a) concurrently connecting said fluid source to the head ends of said first and third cylinder members while connecting the head ends of said second and fourth cylinder members to said sump,
(b) concurrently connecting said fluid source to the head ends of said second and fourth cylinder members while connecting the head ends of said first and third cylinder members to said sump,
(c) blocking fluid communication of the head ends of all of said cylinders with said fluid source and said sump.

15. A hydraulic suspension system as set forth in claim 14, wherein said elevational control means includes:
flow divider means for delivering hydraulic fluid equally to the head ends of said second and fourth cylinder members when said head ends are concurrently connected to said pressure source and for releasing hydraulic fluid equally from said head ends of said second and fourth cylinder members when said head ends are concurrently connected to said sump.

16. A hydraulic suspension system as set forth in claim 14 wherein said source of pressurized hydraulic fluid includes a pressure-demand pump, and further including piloted check valve means for:
(a) allowing fluid from said pump to flow to the head end of said second cylinder member and preventing fluid from flowing from said head end of said second cylinder member to said sump except when the fluid pressure at the head end of said first cylinder member is above a predetermined pressure;
(b) allowing fluid from said pump to flow to the head end of said fourth cylinder member and preventing fluid from flowing from said head end of said fourth cylinder member to said sump except when the fluid pressure at the head end of said third cylinder members is above a predetermined pressure.

17. A hydraulic suspension system as set forth in claim 16, wherein said elevational control means includes:
flow divider means for delivering hydraulic fluid from said pump equally to the head ends of said second and fourth cylinder members when said head ends are concurrently connected to said pressure source and for releasing hydraulic fluid equally from said head ends of said second and fourth cylinder members when said head ends are concurrently connected to said sump.

18. A hydraulic suspension system as set forth in claim 14 and further including:
first stop means for setting the minimum height to which said frame may be lowered relative to said second column,
second stop means for setting the minimum height to which said frame may be lowered relative to said fourth column.

19. A hydraulic suspension system as set forth in claim 18 wherein said source of pressurized hydraulic fluid includes a pressure-demand pump, and further including piloted check valve means for:
(a) allowing fluid from said pump to flow to the head end of second cylinder member and preventing fluid from flowing from said head end of said second cylinder member to said sump except when the fluid pressure at the head end of said first cylinder member is above a predetermined pressure;
(b) allowing fluid from said pump to flow to the head end of said fourth cylinder member and preventing fluid from flowing from said head end of said fourth cylinder member to said sump except when the fluid pressure at the head end of said third cylinder member is above a predetermined pressure.

20. A hydraulic suspension system as set forth in claim 19, wherein said elevational control means includes:

flow divider means for delivering hydraulic fluid from said pump equally to the head ends of said second and fourth cylinder members when said head ends are concurrently connected to said pressure source and for releasing hydraulic fluid equally from said head ends of said second and fourth cylinder members when said head ends are concurrently connected to said sump.

* * * * *